US009022578B2

(12) United States Patent
Nakanishi (10) Patent No.: US 9,022,578 B2
(45) Date of Patent: May 5, 2015

(54) PROJECTION DISPLAY DEVICE

(75) Inventor: Shuichi Nakanishi, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 175 days.

(21) Appl. No.: 13/700,114

(22) PCT Filed: May 28, 2010

(86) PCT No.: PCT/JP2010/059131
§ 371 (c)(1),
(2), (4) Date: Dec. 3, 2012

(87) PCT Pub. No.: WO2011/148507
PCT Pub. Date: Dec. 1, 2011

(65) Prior Publication Data
US 2013/0070208 A1    Mar. 21, 2013

(51) Int. Cl.
*G03B 21/20* (2006.01)
*G03B 21/16* (2006.01)
(Continued)

(52) U.S. Cl.
CPC ............ *G03B 21/16* (2013.01); *G03B 21/2053* (2013.01); *G09G 3/3413* (2013.01); *G09G 2320/041* (2013.01); *G09G 2360/145* (2013.01); *G09G 3/002* (2013.01); *G09G 2320/0242* (2013.01); *G09G 2320/064* (2013.01);
(Continued)

(58) Field of Classification Search
CPC .......................... H04N 9/3155; H04N 9/3197
USPC ................ 353/30, 31, 52, 85, 94, 98; 348/743–748, 751, 756; 315/309, 297, 315/312, 291
See application file for complete search history.

(56) References Cited

U.S. PATENT DOCUMENTS

| 2004/0036668 | A1* | 2/2004 | Nakanishi ...................... 345/88 |
| 2004/0239580 | A1 | 12/2004 | Nagatani et al. |
| 2007/0103646 | A1* | 5/2007 | Young ............................ 353/52 |

(Continued)

FOREIGN PATENT DOCUMENTS

| CN | 1831635 A | 9/2006 |
| CN | 101005594 A | 7/2007 |

(Continued)

OTHER PUBLICATIONS

Japanese Office Action dated May 13, 2014, with partial English translation.

(Continued)

*Primary Examiner* — Sultan Chowdhury
(74) *Attorney, Agent, or Firm* — McGinn IP Law Group, PLLC (57) ABSTRACT

A projection display device includes light sources having light-emitting elements for emitting lights in R, G, B colors, temperature sensors for the respective colors disposed near the light sources in the respective colors, light sensors for the respective colors disposed near the light sources in the respective colors for detecting light leakages from the light sources in the respective colors, a cooling unit for cooling the light sources in the respective colors, light modulators employing three panels of liquid crystal devices, a projection optical system, an amount-of-light controller for maintaining a predetermined ratio of the amounts of lights emitted from the light sources in the respective colors, and a cooling controller for controlling the cooling unit for the light sources in the respective colors.

20 Claims, 6 Drawing Sheets

(51) Int. Cl.
*G09G 3/34* (2006.01)
*G09G 3/00* (2006.01)

(52) U.S. Cl.
CPC .... *G09G2320/0646* (2013.01); *G09G 2330/06* (2013.01); *G09G 2360/16* (2013.01)

(56) References Cited

U.S. PATENT DOCUMENTS

| | | | | |
|---|---|---|---|---|
| 2008/0042578 | A1* | 2/2008 | Arai et al. | 315/32 |
| 2010/0302515 | A1* | 12/2010 | Plut | 353/85 |
| 2011/0273629 | A1* | 11/2011 | Kobori et al. | 348/744 |
| 2013/0107220 | A1* | 5/2013 | Furukawa | 353/20 |

FOREIGN PATENT DOCUMENTS

| | | |
|---|---|---|
| JP | 2002-091401 A | 3/2002 |
| JP | 2003-005714 A | 1/2003 |
| JP | 2004-303564 A | 10/2004 |
| JP | 2004-342557 A | 12/2004 |
| JP | 2005-189323 A | 7/2005 |
| JP | 2007-065012 A | 3/2007 |
| JP | 2007-156211 A | 6/2007 |
| JP | 2008-20549 A | 1/2008 |

OTHER PUBLICATIONS

International Search Report in PCT/JP2010/059131 dated Aug. 31, 2010(English Translation Thereof).

Chinese Office Action dated Aug. 26, 2014 with an English translation.

* cited by examiner

PROJECTION DISPLAY DEVICE

TECHNICAL FIELD

The present invention relates to a projection display device, and more particularly to a projection display device which adjusts the amount of light to an amount-of-light ratio for a desired white balance using light-emitting elements.

BACKGROUND ART

Projection display devices are known as display devices for the user to enjoy video and images on a large screen. Projection display devices of the background art mainly achieve an enlarged-scale display according to the following procedure:

White color from a light source is separated into red light, green light, and blue light by a color separating means, and the separated monochromatic lights are modulated by a light modulator such as a liquid crystal device or a DMD.

The modulated images in the respective hues are combined to generate a color image by a color combining means such as a cross dichroic prism.

The generated color image is displayed at an enlarged scale on a screen or the like by a projection optical system such as a projection lens or the like.

Heretofore, discharge lamps such as high-pressure mercury lamps and metal halide lamps have been used as the light source. In recent years, the use of semiconductor light-emitting elements such as LEDs and semiconductor lasers as the light source has been proposed, and they have actually been used.

These light-emitting elements are advantageous in that they do not emit heat rays and ultraviolet rays compared with the discharge lamps, can easily control energization for light emitting elements, have a high response speed, do not run the risk of rupture, and have a long service life.

In addition, since the light-emitting elements are capable of emitting monochromatic lights in three primaries for producing color video images from red, green, and blue colors, and are also free from the need for color separation, they are appropriate as a light source for projection display devices.

A light-emitting element is mechanically and electrically connected to a board or a lead frame by silver paste, bonding wires, and stud bumps, and sealed and protected by a sealing material such as epoxy resin, silicone gel, or the like.

Since the sealing material has a refractive index of about 1.5, it is effective to increase the efficiency with which to extract light therefrom because of a reduction in the total reflection from a light-emitting device interface of light that is emitted from a light-emitting layer of the light-emitting element in the sealing material.

Light-emitting elements use different light-emitting materials depending on lights to be emitted in different colors. Generally, GaN-base compound semiconductors are widely used to emit light in a wavelength range from ultraviolet to green spectrum, and AlGaInP-base compound semiconductors, referred to as a quaternary material, and GaAs-base compound semiconductors are widely used to emit light in a wavelength range from yellow to red spectrum.

Light-emitting elements emit a lot of heat as well as light. When a large current is supplied to a light-emitting element in order to increase the amount of light emitted thereby, its temperature rises. The light emission efficiency of a light-emitting element is temperature-dependent. Generally, as the junction temperature of a light-emitting element rises, its light emission efficiency decreases. The temperature dependency differs with materials. For example, a red light-emitting element has a large temperature dependency, a green light-emitting element has a small temperature dependency, and a green light-emitting element is almost temperature-independent.

Since different light-emitting materials emit lights in different colors as described above, the degree to which the amount of light emitted at a high temperature is lowered also varies depending on the color of the emitted light. Therefore, when the environmental temperature of a projection display device varies, since the junction temperature of the light-emitting elements also varies, the ratio of the amounts of color lights varies. In other words, it is difficult to keep a desired white balance.

Light-emitting elements further have a problem in that the degree to which the amount of light is lowered due to aging is different depending on the color of the emitted light. Those light-emitting elements which emit lights in shorter wavelengths such as ultraviolet and blue spectrum have their sealing materials more liable to turn yellow than those light-emitting elements which emit lights in longer wavelengths such as red spectrum. Since the transmittance is reduced by yellowing, the amount of light passing through the sealing material is lowered.

Inasmuch as the degree to which the amount of light that is lowered due to long-term use is different depending on the color of the emitted light, maintaining projected images that have the desired white balance for producing white color, that is required for projection display devices, is difficult to achieve over a long period of time.

Figure 1:
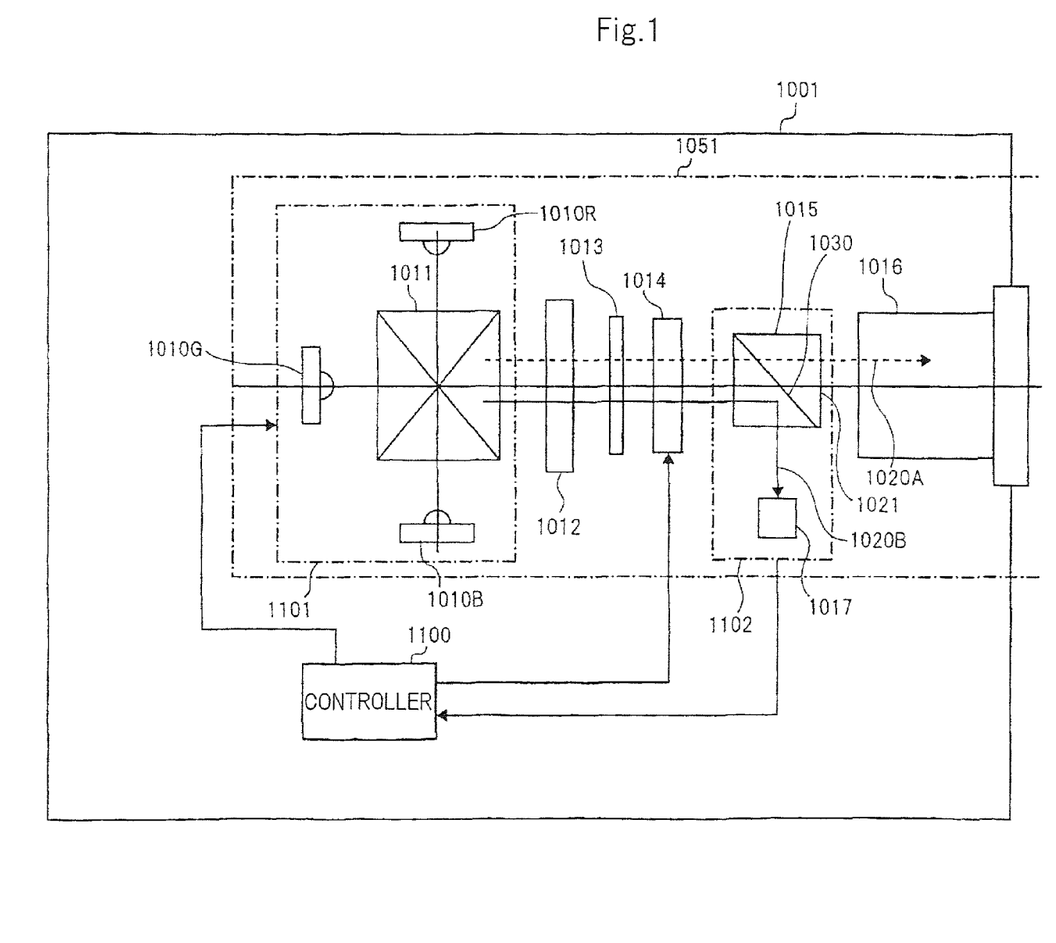
FIG. 1 is a schematic diagram showing an arrangement of the optical system of a projection display device according to the background art.

FIG. 1 is a schematic diagram showing an arrangement of the optical system of a projection display device disclosed in Patent document 1 (JP2007-65012A).

As shown in FIG. 1, optical system 1051 of projection display device 1001 includes R (red) color light source 1010R, G (green) color light source 1010G, B (blue) color light source 1010B, color combining means 1011, light modulator 1014, projection optical system 1016, and photo-detector 1017.

Light sources 1010R, 1010G, 1010B and light modulator 1014 are controlled by controller 1100. R color light source 1010R, G color light source 1010G, and B color light source 1010B that incorporate light-emitting elements therein emit monochromatic lights, which are combined by color combining means 1011 to travel along one light path to polarizer 1013. Although not shown, a polarization unifying means including a polarization beam splitter and a λ/2 phase difference plate is inserted in front of polarizer 1013.

The polarization unifying means applies only a linearly polarized light in one polarized direction through polarizer 1013 to light modulator 1014. In this example, the optical system employs a single-plate light modulator, and hence incorporates an FSC (Field Sequential Color) display system wherein lights in three primaries of red, blue, and green are successively emitted and modulated by light modulator 1014, after which the modulated lights are combined over time to produce a full-color image. Light modulator 1014 controls the direction of polarization of the linearly polarized light applied thereto, depending on the image to be displayed, and the image is projected through detecting assembly 1102 and projection optical system 1016 onto a screen or the like, not shown.

Polarizer 1013 is disposed on a light entrance side of light modulator 1014, and polarization splitting means 1015 is disposed on a light exist side of light modulator 1014. Light modulator 1014 comprises a single liquid crystal device. Polarization splitting means 1015, which comprises a polarization beam splitter or the like, has polarization splitting surface 1030 in the form of a dichroic film that is inclined 45° to the applied light. Polarization splitting means 1015 has a function to pass a linearly polarized light beam in one polarized direction and reflect another linearly polarized light beam in a polarized direction perpendicular thereto.

In FIG. 1, polarization splitting means 1015 passes a linearly polarized light beam in a polarized direction parallel to the sheet of FIG. 1 (hereinafter referred to as "P-polarized light") and reflects a linearly polarized light beam in a polarized direction perpendicular to the sheet of FIG. 1 (hereinafter referred to as "S-polarized light"). As indicated by the broken-line arrow, projection optical system 1016 is disposed on the light path of the P-polarized light beam which represents transmitted light 1020A having passed through polarization splitting means 1015. Projection optical system 1016 projects the light modulated by light modulator 1014 onto a screen or the like, not shown. As indicated by the solid-line arrow, the S-polarized light beam which represents reflected light 1020B reflected by polarization splitting surface 1030 of polarization splitting means 1015 is applied to photodetector 1017. Photodetector 1017 may comprise a photodiode, a phototransistor, or the like for converting the intensity of light into an electric quantity. Polarization splitting means 1015 and photodetector 1017 function as detector 1102. Controller 1100 has a function to energize R color light source 1010R, G color light source 1010G, and B color light source 1010B, and a function to control light modulator 1014 and photodetector 1017. When the illuminance levels of the R, G, B color light sources are detected and supplied to controller 1100 via a feed-back loop, controller 1100 controls the electric power levels of the color light sources in order to keep the white balance at a desired value.

The display device disclosed in JP2007-65012A is problematic in that though it can deal with a reduction in light emission efficiency due to aging of the light-emitting elements, it fails to maintain white balance when the environmental temperature varies since the temperature dependency of the light-emitting elements is not taken into account.

Patent document 1: JP2007-65012A

DISCLOSURE OF THE INVENTION

The light sources of projection display devices which employ LEDs (light-emitting diodes) or semiconductor lasers for emitting lights in three primaries, e.g., red, green, and blue, to be combined, and a light modulator suffer a reduction in light emission efficiency depending on the junction temperature and the different degrees to which the amount of emitted light is lowered due to long-term use depending on the color of the emitted light.

The reasons for the above phenomena are that the materials of the light-emitting elements are different and the sealing material which seals and projects the light-emitting elements is discolored by lights in short wavelengths particularly in the ultraviolet range when in use over a long time, resulting in a reduction in the amount of light emitted through the sealing material. Furthermore, since different compound semiconductors are used as light-emitting materials depending on light emission wavelengths, the degree to which the amount of light emitted especially at a high temperature is lowered due to low-term use varies depending on the color of the emitted light.

For the above reasons, light emission efficiency that varies due to a change in the junction temperature and a change in the brightness of a light-emitting element due to aging is different depending on the color of the emitted light, so that the white balance based on the three primaries of the displayed image varies, and it is impossible to maintain images having an optimum white balance.

In addition, light sources using a plurality of light-emitting elements tend to cause the white balance of displayed images to vary for the same reasons as described above because the brightness of the light in one color tends to vary at a different rate depending on the individual light-emitting element.

It is an object of the present invention to provide a projection display device which is capable of displaying images of high quality with an optimum white balance even when the environmental temperature of the display device changes and the amounts of lights emitted in respective colors from a plurality of light-emitting elements vary owing to aging and failure of the light-emitting elements.

Means for Solving the Problems

According to the present invention, there is provided a projection display device having a plurality of light source assemblies, comprising:

a plurality of temperature sensors, light sensors, and cooling means installed in association with the light sources, respectively;

an amount-of-light controller for controlling amounts of lights emitted from said light sources depending on corresponding output signals from said light sensors;

a cooling controller for controlling cooling operation of said cooling means depending on corresponding output signals from said temperature sensors; and a CPU for controlling said amount-of-light controller depending on an output signal from a temperature detecting means installed in a housing to keep constant a ratio of the amounts of lights emitted from said light sources.

The light source assemblies may include a red color light source for emitting a red color light, a green color light source for emitting a green color light, a blue color light source for emitting a blue color light, and color combining means for combining the lights emitted from the respective light sources. Each of the color light sources may include at least one light-emitting element. The light-emitting element may comprise a light-emitting diode or a semiconductor laser.

Liquid crystal display devices or reflective liquid crystal devices may be included as light modulators. Each of the light sensors may comprise a photodiode or a phototransistor. If each of the light sources in red, green, and blue colors comprises a plurality of light-emitting elements, then the light sensors may be provided in association with the light-emitting elements, respectively.

The amount-of-light control means may compare amounts of light emitted from the light-emitting elements in the red, green, and blue colors, based on the amounts of lights detected by the light sensors, and may control driving conditions for the light sources in order to keep the white balance based on the colors.

Since the amounts of lights in the red color, the green color, and the blue color are measured by the light sensors, and the amount-of-light controller changes driving conditions for the light-emitting elements to adjust the amounts of lights in the respective colors to the ratio of the amounts of lights for achieving the desired white balance, it is possible to maintain displayed images with the optimum white balance even if the junction temperatures of the light-emitting elements vary to change the light emission efficiency and even if the light-emitting elements are deteriorated from long-term use, reducing the amounts of lights emitted thereby.

Advantages of the Invention

According to the present invention, even if the brightness of each of the light-emitting elements in the respective colors varies due to temperature or aging, since the intensities of the lights emitted from the light-emitting elements are monitored, the amount-of-light controller can change the driving conditions for the red color light, the green color light, and the blue color light to achieve the optimum white balance. Consequently, the projection display device offers the following advantages:

1) Even if the brightness of each of the light-emitting elements in the respective colors varies due to changes in the junction temperature, the individual light-emitting device specificity, aging of the light-emitting element, and driving conditions therefore, a white balance and color reproducibility range can be maintained.

2) Chromaticity coordinates of the white color and chromaticity coordinates of the three primaries can be brought to match given video standards.

3) Displayed images can be brightened or darkened for electric power saving while maintaining a white balance and a color reproducibility range depending on the video signal.

BEST MODE FOR CARRYING OUT THE INVENTION

A projection display device according to the present invention comprises a light source including light-emitting elements for emitting lights in colors of red, green, and blue, light modulators including liquid crystal devices, light sensors, an amount-of-light controller, and a light source cooling means. The light sensors detect respective amounts of lights emitted from the respective light-emitting elements, and the amount-of-light controller compares and adjusts the amounts of lights from the light-emitting elements in the respective colors of red, green, and blue to keep a white balance based on the colors. The projection display device maintains displayed images with an optimum white balance even when the junction temperatures of the light-emitting elements vary and even when the light-emitting elements are deteriorated due to long-term use, resulting in a reduction in the amounts of emitted lights. The white balance means the ratio (balance) of the amounts of lights emitted from the light-emitting elements in the respective colors of red, green, and blue.

Figure 2:
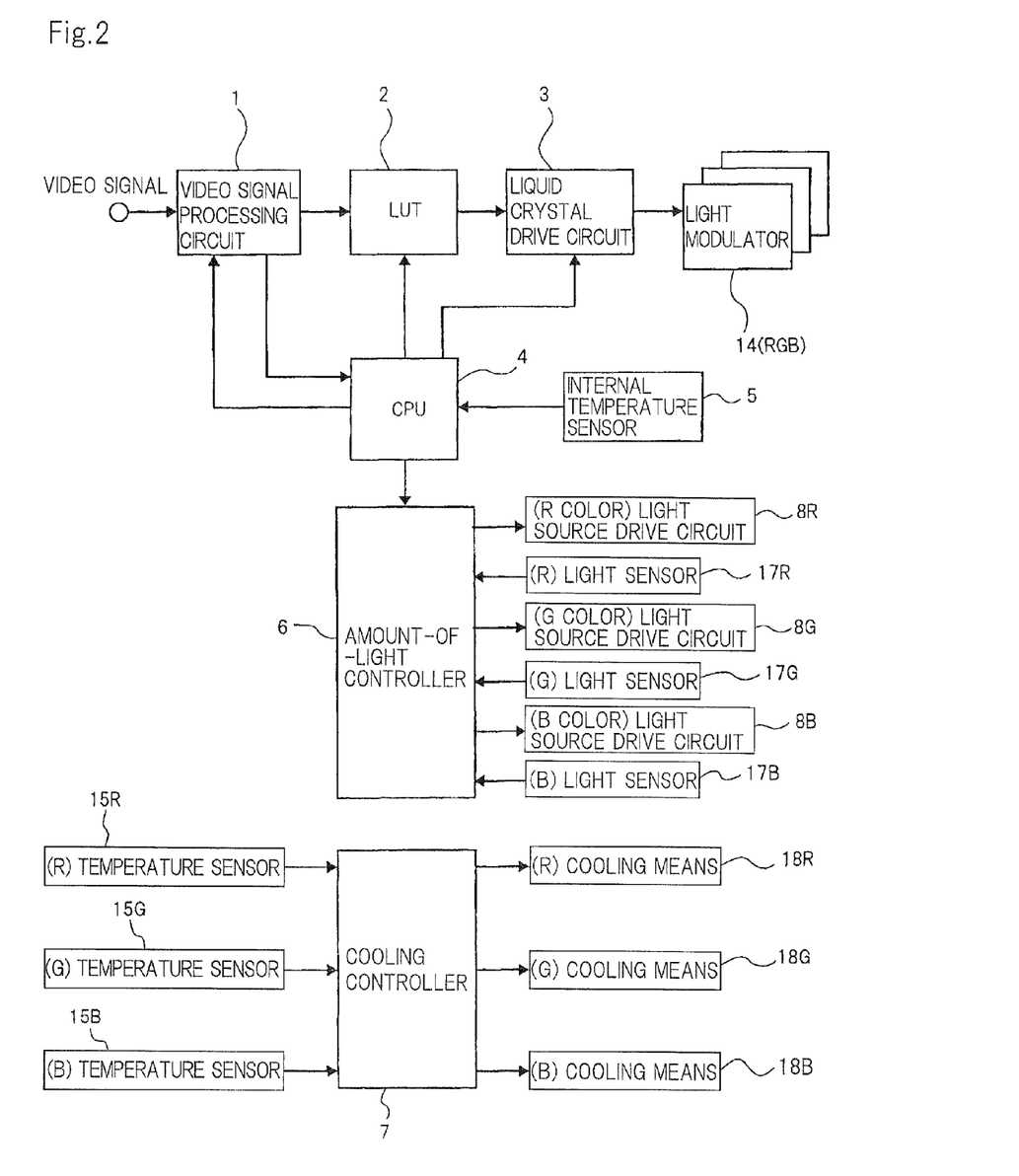
FIG. 2 is a block diagram of a projection display device according to a first exemplary embodiment of the present invention.

A first exemplary embodiment of the present invention will be described below with reference to the drawings. FIG. 2 is a block diagram of a projection display device according to a first exemplary embodiment of the present invention.

Video signal processing circuit 1 includes a scaling circuit which receives video signals having various frequencies and resolutions and converts them into a frequency and a resolution suitable for the light modulators, and a detecting circuit which receives horizontal and vertical synchronizing signals, generates timing signals required in various parts of the display device, and detects APL (Average Picture Level), histograms, etc., of the video signals.

Video signal processing circuit 1 applies an output signal to LUT (Look-Up Table) 2, which corrects voltage vs. transmittance characteristics of the liquid crystal device, performs gamma correction, and performs various color adjustments for a color space converter, etc.

Liquid crystal drive circuit 3 energizes a plurality of light modulators 14 corresponding to R, G, B, respectively. Since liquid crystal drive circuit 3 and light modulators 14 are equivalent to general circuits in three-panel liquid crystal projectors, they will not be described in detail below.

CPU 4 controls video signal processing circuit 1, LUT 2, and liquid crystal drive circuit 3, and monitors an output signal from internal temperature sensor 5. CPU 4 also controls amount-of-light controller 6.

Cooling controller 7 receives the output signals from temperature sensors 15R, 15G, 15B disposed near the light sources in the colors of R, G, B, respectively, and supplies predetermined amounts of electric power depending on the output signals to cooling means 18R, 18G, 18B which cool the light sources in the colors of R, G, B, respectively.

Internal temperature sensor 5 is installed within the housing of the display device near the light modulators, for example. Individual temperature sensors may be installed near the respective light modulators for the respective colors. CPU 4 may calculate the average of the detected temperatures or may weight the detected temperatures appropriately.

After the display device has been switched on and brought into a state of thermal equilibrium, the temperature in the display device is strongly correlated to the environmental (ambient) temperature around the display device when the electric power consumed by the display device is constant. Specifically, when the ambient temperature rises, the temperature detected by the internal temperature sensor 5 also rises. If the ambient temperature and the internal temperature are sampled for calibration when the display device is manufactured, then individual temperature sensor variations can be corrected.

The temperature sensor may not be installed in the housing, but may be located outside of the housing to directly detect the ambient temperature. In the exemplary embodiment, the temperature sensor is installed at one location in the housing.

Figure 3:
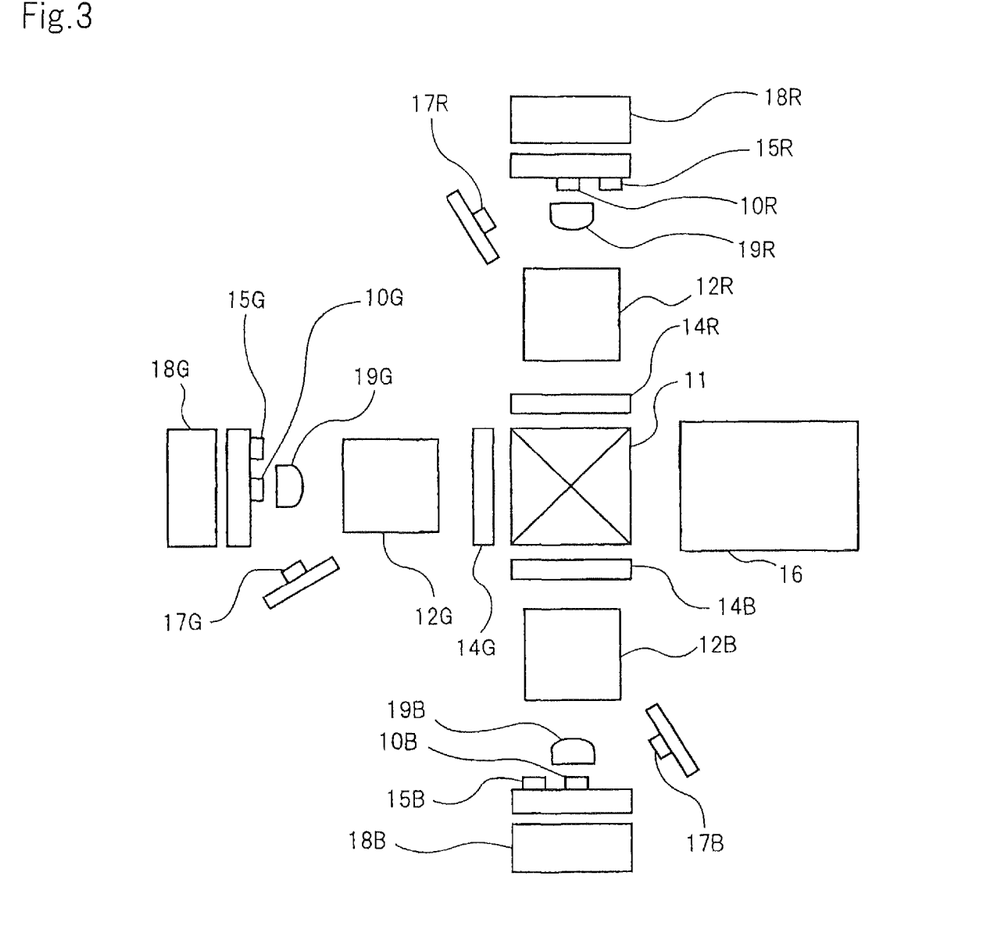
FIG. 3 is a schematic diagram showing an arrangement of the optical system of the projection display device according to the first exemplary embodiment of the present invention.

FIG. 3 is a schematic diagram showing an arrangement of the optical system of the projection display device according to the present exemplary embodiment. Any details of the projection display device which do not have a direct bearing on the present invention are omitted from illustration in FIG. 3.

The projection display device according to the present exemplary embodiment has R (red) color light source 10R, G (green) color light source 10G, and B (blue) color light source 10B, and also has temperature sensors 15R, 15G, 15B disposed near the light sources, respectively, and light sensors 17R, 17G, 17B disposed near the light sources, respectively, to detect light leakages.

Operation of the projection display device according to the present exemplary embodiment will be described below. In FIG. 3, respective lights emitted from R color light source 10R, G color light source 10G, and B color light source 10B, each having light-emitting elements for emitting a monochromatic light, pass through respective condenser lenses 19R, 19G, 19B and respective illumination optical systems 12R, 12G, 12B, are modulated by respective light modulators 14R, 14G, 14B, and are combined together by color combining means 11. Color combining means 11 comprises a cross dichroic prism, a cross dichroic mirror, or the like.

The light that has passed through color combining means 11 is projected by projection optical system 16 onto the projection surface of a screen, not shown.

Light sensors 17R, 17G, 17B which are disposed near the light sources, respectively, detect light leakages which are not directly emitted to the light modulator. Since the light leakages are strongly correlated to the intensities of the lights that are directly applied to the light modulator, it is possible to detect the amounts of lights that are directly applied to the light modulator by detecting the light leakages. If data are sampled for calibration when the display device is manufactured, then individual light-emitting element variations can be corrected. Even though a light source in one color has a plurality of light-emitting elements, individual light-emitting element differences can be absorbed by measuring the combined amount of lights emitted from the light-emitting elements.

Amount-of-light controller 6 controls light source drive circuits 8R, 8G, 8B depending on the output signals from light sensors 17R, 17G, 17B for thereby adjusting the output lights from respective light sources 10R, 10G, 10B to achieve the desired white balance. Amount-of-light controller 6 may adjust the output lights from respective light sources by controlling the current values thereof or by performing a PWM (Pulse Width Modulation) control process. In the present exemplary embodiment, the PWM control process will be described below.

To control the light sources according to the PWM control process, it is desirable to use current-to-frequency conversion light sensors which are capable of measuring the amounts of lights with high accuracy. A current-to-frequency conversion light sensor converts the intensity of light detected by a photodiode into a current, then converts the current into a frequency, and counts pulses over a given period with a clock of fixed frequency to determine an illuminance level. The light sensor of this type is suitable for determining the amount of light over a given period or an average illuminance level.

In order to control the amounts of lights emitted from the light sources according to the PWM control process, the general practice is to synchronize the periods of PWM control process with the frames of the video signal. When the periods of PWM control process are in synchronism with the frames of the video signal, the amounts of lights in each frame can be controlled at a constant level. However, since a large amount of electric power is needed to energize the light-emitting elements, large electromagnetic interference waves are generated at changing points of the PWM control process. Therefore, if the periods of the PWM control process are the same and are synchronous with the frames, then they cause disadvantages from an EMI (ElectroMagnetic Interference) point of view. The same periods of the PWM control process mean the same switching frequencies of the drive circuit for the light sources, and have the spectrums of the electromagnetic interference waves overlapping each other.

According to the present exemplary embodiment, the PWM periods for energizing the light sources in the respective colors are different from each other in order to reduce unwanted spectrum of the electromagnetic interference waves. Therefore, the PWM periods for the respective colors are not synchronized with the frames of the video signal.

The different PWM periods for energizing the light sources are advantageous in that since the switching frequencies of the drive circuit are different from each other, the spectrums of the electromagnetic interference waves do not overlap each other, and the EMI peaks are lowered.

The fact that the frames of the video signal and the PWM periods for energizing the light sources are not synchronous with each other means that the frame updating of the light modulators is not synchronous with controlling the amounts of illuminating light, resulting in a deterioration of color reproducibility of the projected images. However, since synchronism errors can be reduced to within one PWM period, the ratio over time of the errors to the frame periods can be reduced by reducing the PWM periods, thereby reducing deterioration of color reproducibility.

The PWM periods of at least one color may be synchronized with the video signal frames. For example, if the PWM control process for the G color light source which provides a high spectral luminous efficiency is synchronized with the frames of the video signal, then since the frame updating of the light modulators is synchronized with the controlling of the amounts of illuminating light, the EMI can be reduced while at the same time minimizing the deterioration of the color reproducibility of projected images, particularly the projected moving images.

Moreover, the PWM periods for energizing the light sources may be different from each other, and the PWM periods for all the colors may be synchronized with the frames of the video signal. For example, if the frame frequency of the video signal is 60 Hz, then the PWM periods for energizing the light sources in the R, G, B colors may be integral multiples of the frame frequency of the video signal, such as 5×60 Hz, 6×60 Hz, and 7×60 Hz, and their basic frequencies may be different from each other. However, since there is a common multiplying component, the improvement of EMI is reduced.

As described above, whether the light sources in the respective light sources are to be driven in synchronism with the frames of the video signals depends upon a trade-off between the degree to which the EMI is improved and the degree to which the color reproducibility is degraded.

Light sources 10R, 10G, 10B in the respective colors are combined respectively with cooling means 18R, 18G, 18B. Specific examples of cooling means 18R, 18G, 18B include air-cooling fans, liquid-cooling systems using pumps, and Peltier devices, etc., which may appropriately be selected.

According to the present exemplary embodiment, given amounts of electric power depending on the detection output signals from the temperature sensors that are disposed near the light sources in the respective colors are output to the respective cooling means.

Since temperature sensors 15R, 15G, 15B are disposed near light sources 10R, 10G, 10B in the respective colors, the detection output signals thereof are strongly correlated to the junction temperatures of the light-emitting elements of the light sources. If data are sampled for calibration when the display device is manufactured, then temperature sensor variations can be corrected.

Thermal resistances from the temperature sensors to the junctions of the light-emitting elements may be determined in advance, and the junction temperatures of the light-emitting elements may be determined as needed by determining the amounts of electric power consumed by the light-emitting elements.

Junction temperature (° C.) of light-emitting element=temperature (° C.) of temperature sensor+thermal resistance (° C./W) from temperature sensor to junction of light-emitting element x electric power (W) consumed by light-emitting element If each of the light sources in the respective colors comprises a plurality of light-emitting elements, then it is desirable to install a temperature sensor near each of the light-emitting elements.

A process of adjusting the amounts of lights in the respective colors will be described below with reference to FIG. 2. If the chromaticity coordinates of the colors of lights emitted from the light sources in the R, G, B colors are known, then the ratio of the amounts of lights to be emitted from the light sources is determined when the chromaticity coordinates of a mixed color light are determined.

For example, when the chromaticity coordinates (x, y) according to the CIE (Commission Internationale de l'Eclairage) 1931 standard color system are to be (0.3127, 0.329) for the mixed color light if the chromaticity coordinates (x, y) are (0.698, 0.302) for the R color light, (0.194, 0.706) for the G color light, and (0.141, 0.046) for the B color light, the ratio of the amounts of lights may be set to the amount of the R color light:the amount of the G color light:the amount of the B color light=25.5:68.9:5.61.

If the ratio of the amounts of lights emitted from the light sources in the respective colors is measured, then the chromaticity coordinates of the mixed color light can be calculated. The chromaticity coordinates of the colors of the emitted R, G, and B color light sources may be fixed according to the specifications of the light sources. If individual light source differences are to be taken into account, then chromaticity coordinates may be measured for the respective light sources and reflected in calculations. If deviations of chromaticity coordinates of the colors of the emitted lights due to light source driving conditions such as drive currents are to be taken into account, then data may be stored in advance and reflected in calculations depending on the driving conditions.

It will hereinafter be assumed for the sake of brevity that the chromaticity coordinates of the colors of the emitted R, G, and B color light sources are fixed. The ratio of the amounts of lights in the respective colors means the ratio of the amounts of lights measured in a predetermined period by the light sensors for the respective colors (or the ratio of average illuminance levels in the predetermined period), which is strongly correlated to the ratio of the amounts of projected lights in the respective colors in the predetermined period. The amount of electric power that is supplied to the light sources as a whole is determined by the duty ratios of the PWM control process for the respective colors. CPU 4 determines the ratio of the amounts of lights in the respective colors for achieving a desired white balance, determines the absolute values (target amounts of lights) of the amounts of lights in respective colors in the predetermined period (or the average illuminance levels in the predetermined period) from a desired white brightness, and issues a control command to amount-of-light controller 6.

Amount-of-light controller 6 detects the output signals from light sensors 17R, 17G, 17B for the respective colors, and controls the duty ratios of the PWM control process by performing feed-back loop control on light source drive circuits 8R, 8G, 8B for the respective colors in order to equalize the measured amounts of lights in the respective colors to the target amounts of lights. Therefore, once a white balance and a brightness are set, the white balance is maintained at a desired value irrespective of changes in the junction temperatures of the light-emitting elements and aging thereof.

If the brightness is to be adjusted while the white balance is being maintained, then CPU 4 changes the target amounts of lights in the respective colors without changing the ratio of the amounts of lights in the respective colors. Conversely, if the white balance is to be adjusted, then CPU 4 adjusts the ratio of the amounts of lights in R, G, B.

Figure 4:
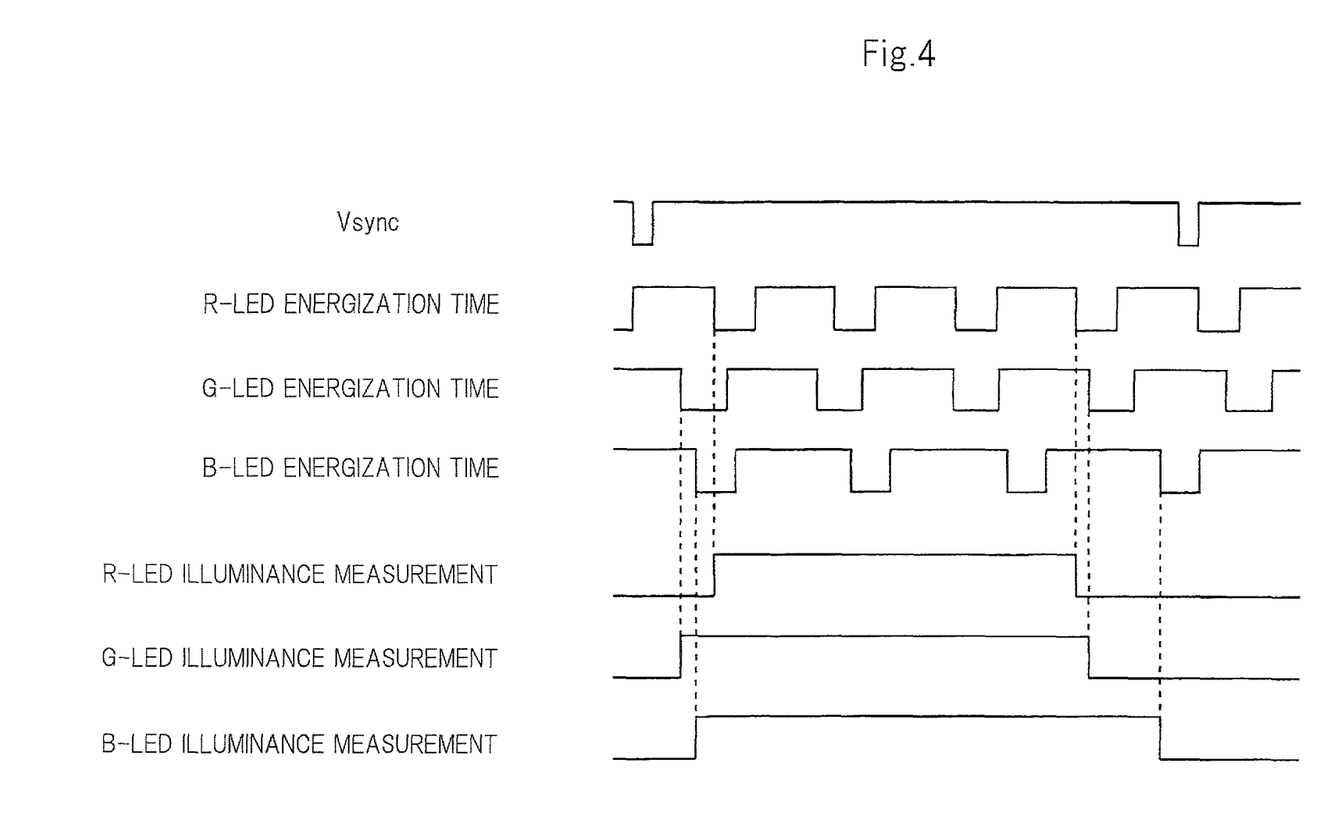
FIG. 4 is a timing chart of a video signal, times during which light sources in respective colors are energized, and times during which the illuminance levels of the light sources are measured by respective light sensors.

A process of measuring illuminance levels with the light sensors and controlling the amounts of lights will be described below. FIG. 4 is a timing chart of times during which the light sources in the respective colors are energized, and periods in which the illuminance levels are measured by the light sensors for the respective colors. The periods in which the illuminance levels are measured by the light sensors are three times the PWM periods for the respective colors, for example.

As described above, the PWM periods for the respective colors are not in synchronism with the video signal, and are not the same as each other. The fact that the PWM periods for the respective colors are not in synchronism with the video signal means that the integral multiple of the PWM periods is not,equal to the period of one frame of the video signal (a period from a negative-going edge of Vsync to a next negative-going edge thereof). In FIG. 4, the PWM periods are progressively longer in the order of R, G, B. When the display device is switched on, for example, it is initialized such that the vertical synchronizing signal and the PWM control process for the respective colors are synchronized only once.

The light sensors for the respective colors starts measuring illuminance levels at first negative-going edges of the PWM control process from a negative-going edge of the vertical synchronizing signal (Vsync). In FIG. 4,the light sensors measure the illuminance levels over three periods for the respective colors in synchronism with the PWM control process for the respective colors.

When measurement of the illuminance levels for the respective colors is finished, amount-of-light controller 6 controls light source drive circuits 8R, 8G, 8B based on the measured illuminance levels while maintaining the ratio of the amounts of lights in the respective colors in time for the next frame. Specifically, the illuminance levels for the respective colors in the present frame are measured, and the measured illuminance levels are reflected in the next frame.

If necessary, the duty ratios of the PWM control process are changed in the next frame. The difference between the frame in which the illuminance levels are measured and the timing of controlling the amounts of light emitted from the light sources should desirably be small, and represents one frame in the present exemplary embodiment.

Since the frame period of the video signal and the PWM periods of the light-emitting elements in the respective colors are not synchronous with each other, the timing for changing the amounts of lights in the respective colors is not in accord with the frame period, but deviates from each frame. This results in an error of the brightness of each color depending on the frame. However, the error does not essentially affect still images because human vision integrates and hence does not detect such a brightness error. The error does not cause problems for moving images either because image changes are visually more dominant than brightness errors.

If the brightness of the light sources is changed depending on the contents of the video signal (so-called adaptive light control), then the brightness of the light sources is adjusted based on APL or a histogram, it is therefore not necessary to perform a high-speed operation such as a quick adjustment of the brightness in each frame, but the brightness may be changed slowly over a range from one second to several seconds. Therefore, such adaptive light control does not cause problems.

Since the illuminance levels are measured in synchronism with the PWM control process, a brightness error depending on the frame does not affect the white balance adjustment.

Figure 5:
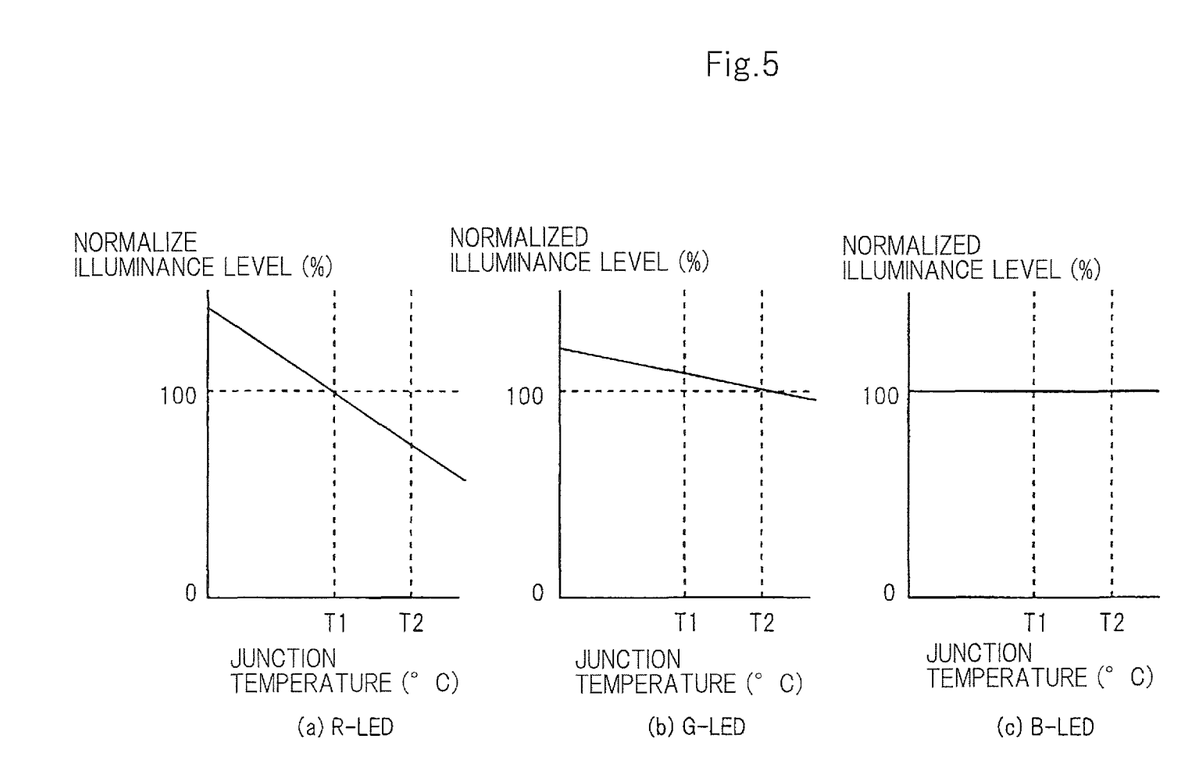
FIG. 5 is a set of diagrams showing the relationship between the junction temperatures of R, G, B LEDs and the illuminance levels.

Effects of the junction temperatures of the light-emitting elements will be described below. FIG. 5 is a set of diagrams showing characteristic curves based on the junction temperatures of LEDs in the three colors, R, G, and B, and normalized illuminance levels. FIG. 5(a) shows a characteristic curve for the red LED, FIG. 5(b) a characteristic curve for the green LED, and FIG. 5(c) a characteristic curve for the blue LED.

As described above, the LEDs are made of different materials depending on the wave-lengths of color lights emitted thereby. Therefore, illuminance levels thereof depend on the temperature differently due to the physical properties of the materials. Normalized illuminance levels refer to relative illuminance levels with respect to an illuminance level of 100% at a certain temperature.

One example of the tendency of the temperature characteristics of LEDs will be described below. As shown in FIG. 5(a), if the red LED has an illuminance level of 100% when the junction temperature is T1° C. (e.g., 40° C.), then the illuminance level drops by 50% or more when the junction temperature rises by 50° C. In other words, the temperature dependency of the red LED is high. If the green LED has an illuminance level of 100% when the junction temperature is T1° C. (e.g., 40° C.), then the illuminance level drops by about 10% when the junction temperature rises by 50° C. The blue LED has its illuminance level remains essentially unchanged regardless of the junction temperature. As the junction temperature of the red LED increases, the illuminance level of the red LED decreases, making it difficult to maintain a white balance. If the illuminance level of an LED, which is generally proportional to the amount of electric power supplied to energize the LED, is lowered due to its temperature dependency, then an additional amount of electric power needs to be supplied. Since the junction temperature also depends on the supplied amount of electric power, the cooling means needs to be supplied with electric power, with the result that the display device as a whole requires increased electric power consumption. The increased electric power consumption does not necessarily contribute to the performance of the display device for an increase in brightness and the maintenance of a white balance, and fails to meet society's demands for energy conservation.

Normally, in a standard environment (e.g., an ambient temperature=25° C.), the amount of electric power to be supplied to cooling means 18R for the red LED is determined in order for the junction temperature of the red LED not to exceed a predetermined temperature when the brightness is maximum. CPU 4 monitors the temperature detected by internal temperature sensor 5 at all times. Since the temperature in the housing is strongly correlated to the ambient temperature (e.g., the temperature in the housing=the ambient temperature+20° C.), a change in the ambient temperature can be detected. If CPU 4 judges that the ambient temperature has risen, then CPU 4 issues a command for lowering the absolute value of the PWM duty ratio for each color to amount-of-light controller 6 while maintaining the white balance (i.e., while maintaining the ratio of the amounts of lights in R, G, B). In other words, CPU 4 controls the amount-of-light controller in the same manner so as to lower the brightness while maintaining the white balance (e.g., to lower the absolute value of the duty ratio for each color by 3% each time the ambient temperature rises by 1° C.).

If the ambient temperature has risen and hence the brightness has been lowered, then the original state can be restored when the ambient temperature is lowered due to air-conditioning or the like. If the ambient temperature is higher than in the standard environment, then a desired brightness and a desire white balance can be achieved with smaller electric power consumption than in the standard environment.

Figure 6:
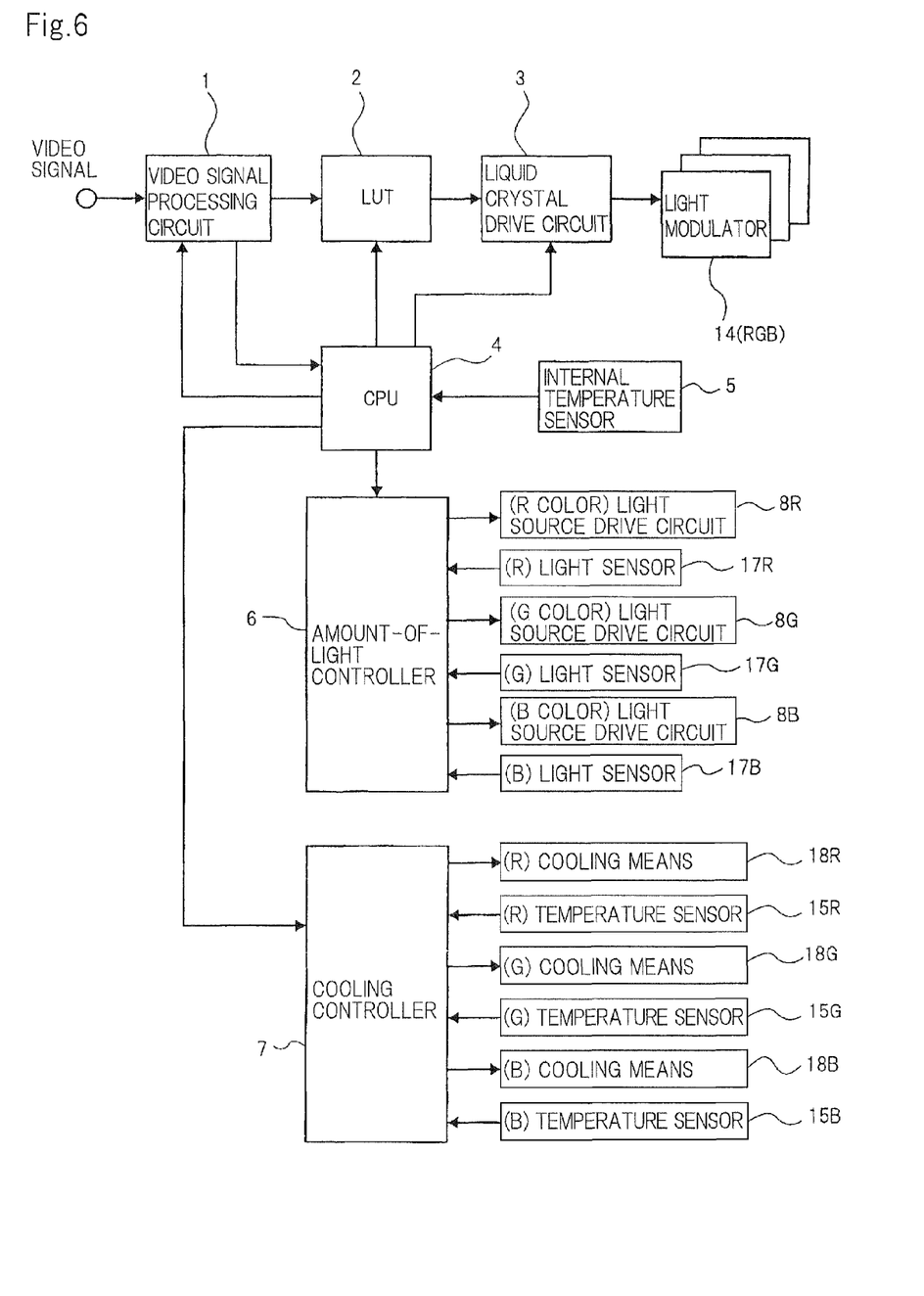
FIG. 6 is a block diagram of a projection display device according to a second exemplary embodiment of the present invention.

A second exemplary embodiment of the present invention will be described below. FIG. 6 is a block diagram of a projection display device according to a second exemplary embodiment of the present invention.

According to the present exemplary embodiment, the projection display device is different from the projection display device according to the first exemplary embodiment only as to the arrangement of cooling controller 7, and is the same the projection display device according to the first exemplary embodiment as to other parts and operation. Identical parts are denoted by identical reference characters in FIG. 2, and will not be described below. The optical system has the same arrangement as shown in FIG. 3.

According to the first exemplary embodiment, cooling controller 7 supplies amounts of electric power predetermined according to the temperatures detected by temperature sensors 15R, 15G, 15B for the respective colors to cooling means 18R, 18G, 18B for the respective colors. For example, if the PWM duty ratio for the red color has increased depending on the detection result from light sensor 17R for the red color, then the illuminance level of the light-emitting element in the red color increases. If the illuminance level has increased, then since the junction temperature of the light-emitting element in the red color increases, the temperature detected by temperature sensor 15R for the red color goes higher. Cooling controller 7 supplies an amount of electric power predetermined according to the newly detected temperature to cooling mean 18R for the red color. In other words, cooling controller 7 according to the first exemplary embodiment controls the cooling means for the respective colors depending on the output signals from the temperature sensors for the respective colors, and operates independently of amount-of-light controller 6.

According to the present exemplary embodiment, cooling controller 7 controls the amounts of electric power to be supplied to cooling means 18R, 18G, 18B for the respective colors in order to keep constant output signals from the temperature sensors for the respective colors. CPU 4 transmits target temperature values for keeping constant output signals from the temperature sensors for the respective colors to cooling controller 7, based on commands to amount-of-light controller 6 (settings for the amounts of electric power required to energize the light sources in the respective colors).

Inasmuch as the amounts of lights increase and decrease in correlation to the temperatures of the light-emitting elements, a loop for controlling the amounts of lights and a loop for controlling the cooling of the light sources tend to affect each other, thus causing the control system to oscillate and become unstable. Consequently, the response speed of the loop for controlling the amounts of lights is converged more quickly than the response speed of the loop for controlling the cooling of the light sources.

Specifically, the rate of change in the amounts of lights under amount-of-light control is made greater than the rate of change of the amounts of lights under cooling control. The rate of change in an amount of light is represented by a value produced by dividing a change ($\Delta L$) in the amount of light which is required for the amount of light to reach a prescribed amount of light from a given deviation $\Delta L$, by a time $\Delta t$ consumed until the amount of light is converged to the prescribed amount of light under amount-of-light control.

$$\text{Rate of change in amount of light} = \Delta L/\Delta t$$

Under cooling control, as the junction temperatures of the light-emitting elements are correlated to the illuminance levels thereof, the junction temperatures increase and decrease when the cooling capability is increased and decreased, and the amounts of lights are indirectly increased and decreased. The above oscillation is prevented from happening by initially converging the amount-of-light control systems and then converging the cooling control systems slowly over time. Inasmuch the temperature dependency of the illuminance levels also depends on the wavelengths of the emitted lights, the cooling control systems for the respective colors operate independently of each other.

According to the present invention, as described above, the brightness can be adjusted while maintaining the white balance at a desired value, and a high image quality can be achieved no matter what environment the projection display device is used in and even when it is used for a long period of time, irrespective of:

(1) changes in the environmental temperature of the projection display device; and (2) aging of the light-emitting elements.

DESCRIPTION OF REFERENCE CHARACTERS:

1 video signal processing circuit
2 LUT
3 liquid crystal drive circuit
4 CPU
5 internal temperature sensor
6 amount-of-light controller
7 cooling controller
8R, 8G, 8B light source drive circuit
10 R color light source
10G G color light source
10B B color light source
11 color combining means
12R, 12G, 12B illumination optical system
14R, 14G, 14B light modulator
15R, 15G, 15R temperature sensor
16 projection optical system
17R, 17G, 17B light sensor
18R, 18G, 18B cooling means
19R, 19G, 19B condenser lens

The invention claimed is:

1. A projection display device having a plurality of light sources and displaying images based on a video signal, comprising:
 a plurality of temperature sensors, light sensors, and cooling means installed in association with the light sources, respectively;
 an amount-of-light controller for controlling amounts of lights emitted from said light sources depending on corresponding output signals from said light sensors;
 a cooling controller for controlling cooling operation of said cooling means depending on corresponding output signals from said temperature sensors; and
 a central processing unit (CPU) for controlling said amount-of-light controller depending on an output signal from a temperature detecting means installed in a housing to keep constant a ratio of the amounts of lights emitted from said light sources,
 wherein said plurality of light source are controlled by Pulse Width Modulation (PWM), and PWM switching frequency is different from a frame frequency of said video signal.

2. The projection display device according to claim 1, wherein said light sources include a red color light source for emitting a red color light, a green color light source for emitting a green color light, a blue color light source for emitting a blue color light, and color combining means for combining the lights emitted from the respective light sources.

3. The projection display device according to claim 2, wherein each of the color light sources includes at least one light-emitting element.

4. The projection display device according to claim 3, wherein said light-emitting element comprises a light-emitting diode.

5. The projection display device according to claim 3, wherein said light-emitting element comprises a semiconductor laser.

6. The projection display device according to claim 1, further including a plurality of liquid crystal devices as light modulators.

7. The projection display device according to claim 1, wherein PWM switching frequencies for said plurality of light sources are different, respectively.

8. The projection display device according to claim 1, wherein said light sensors measure illuminance levels in synchronism with periods in which the amounts of color lights emitted from said light sources are adjusted.

9. The projection display device according to claim 1, wherein, when the projection display device is switched on, a vertical synchronizing signal and the PWM control for respective colors of the light sources are synchronized only once.

10. The projection display device according to claim 1, wherein PWM switching frequencies of at least one color of the light sources are synchronized with the frame frequency of said video signal.

11. The projection display device according to claim 1, wherein PWM switching frequencies for all the colors of the light sources are synchronized with the frame frequency of said video signal.

12. The projection display device according to claim 1, wherein an amount of electric power that is supplied to the light sources as a whole is determined by duty ratios of the PWM control for the respective colors of the light sources.

13. The projection display device according to claim 1, wherein the CPU is configured to:
 determine the ratio of the amounts of lights in the respective colors of the light sources for achieving a desired white balance;
 determine absolute values of the amounts of lights in respective colors in a predetermined period from a desired white brightness; and
 control said amount-of-light controller based on the ratio of the amounts of lights and the absolute values of the amounts of lights.

14. The projection display device according to claim 1, wherein the CPU is configured to:
 determine the ratio of the amounts of lights in the respective colors of the light sources for achieving a desired white balance;
 determine average illuminance levels in a predetermined period of the amounts of lights in respective colors in a predetermined period from a desired white brightness; and
 control said amount-of-light controller based on the average illuminance levels of the amounts of lights and the absolute values of the amounts of lights.

15. The projection display device according to claim 1, wherein said amount-of-light controller detects the output signals from said light sensors for the respective colors of the light sources, and controls duty ratios of the PWM control process by performing a feed-back loop control on light source drive circuits for the respective colors in order to equalize measured amounts of lights in the respective colors to target amounts of lights such that a white balance is maintained at a desired value irrespective of changes in junction temperatures of the light-emitting elements.

16. The projection display device according to claim 1, wherein a white balance is maintained at a desired value irrespective of changes in junction temperatures of the light-emitting elements.

17. The projection display device according to claim 1, wherein, if a brightness is to be adjusted while a white balance is being maintained, the CPU changes target amounts of lights in the respective colors of the light sources without changing the ratio of the amounts of lights in the respective colors of the light sources.

18. The projection display device according to claim 1, wherein the CPU adjusts a white balance by adjusting the ratio of the amounts of lights.

19. The projection display device according to claim 1, wherein a second temperature detecting means is installed outside of the housing for detecting an ambient temperature.

20. A projection display device displaying images based on a video signal, comprising:
- a plurality of light sources;
- a plurality of light sensors installed in association with the light sources, respectively; and
- an amount-of-light controller for controlling amounts of lights emitted from said light sources depending on corresponding signals from said light sensors,
- wherein said plurality of light sources are controlled by Pulse Width Modulation (PWM), and PWM switching frequency is different from a frame frequency of said video signal.

* * * * *